US009948691B2

(12) United States Patent
Dawson et al.

(10) Patent No.: US 9,948,691 B2
(45) Date of Patent: *Apr. 17, 2018

(54) REDUCING INPUT PROCESSING LATENCY FOR REMOTELY EXECUTED APPLICATIONS

(71) Applicant: Amazon Technologies, Inc., Seattle, WA (US)

(72) Inventors: Simon R. Dawson, Irvine, CA (US); David M. Isen, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 311 days.

This patent is subject to a terminal disclaimer.

(21) Appl. No.: 14/826,491

(22) Filed: Aug. 14, 2015

(65) Prior Publication Data
US 2015/0350286 A1 Dec. 3, 2015

Related U.S. Application Data

(63) Continuation of application No. 13/407,919, filed on Feb. 29, 2012, now Pat. No. 9,111,080.

(51) Int. Cl.
G06F 15/16 (2006.01)
H04L 29/06 (2006.01)
G06F 21/34 (2013.01)
G06F 3/0484 (2013.01)
G06F 3/0488 (2013.01)
G06F 1/16 (2006.01)
G06F 3/01 (2006.01)
G06F 3/038 (2013.01)

(52) U.S. Cl.
CPC .......... *H04L 65/607* (2013.01); *G06F 1/1694* (2013.01); *G06F 3/017* (2013.01); *G06F 3/038* (2013.01); *G06F 3/0488* (2013.01); *G06F 3/04842* (2013.01); *G06F 3/04847* (2013.01); *G06F 3/04883* (2013.01); *G06F 21/34* (2013.01); *H04L 65/60* (2013.01); *G06F 2203/0383* (2013.01)

(58) Field of Classification Search
CPC . G06F 15/16; G06F 7/00; G06F 17/30; H04L 29/08; H04L 67/306; H04L 67/02; H04L 63/02
USPC .......................................................... 709/201
See application file for complete search history.

(56) References Cited

U.S. PATENT DOCUMENTS

2004/0078822 A1* 4/2004 Breen ................ H04N 7/17318 725/86
2006/0203730 A1 9/2006 Zur
2010/0198992 A1* 8/2010 Morrison ............. G10H 1/0058 709/248
2011/0257958 A1 10/2011 Kildevaeld
(Continued)

Primary Examiner — Tu Nguyen
(74) Attorney, Agent, or Firm — Thomas | Horstemeyer, LLP

(57) ABSTRACT

Disclosed are various embodiments for reducing input processing latency for remotely executed applications. An application is executed in a hosted environment, and a video signal generated by the application is encoded into a media stream. The media stream is sent to a client by way of a network. User input data for the application is obtained from the client computing device by way of the network. The user input data is processed server side, rather than client side, at a latency-compensating processing rate.

20 Claims, 7 Drawing Sheets

(56) References Cited

U.S. PATENT DOCUMENTS

2012/0081577 A1 4/2012 Cote et al.
2012/0242590 A1 9/2012 Baccichet et al.

* cited by examiner

REDUCING INPUT PROCESSING LATENCY FOR REMOTELY EXECUTED APPLICATIONS

CROSS-REFERENCE TO RELATED APPLICATIONS

This application is a continuation of, and claims priority to, co-pending U.S. patent application entitled "REDUCING INPUT PROCESSING LATENCY FOR REMOTELY EXECUTED APPLICATIONS," filed on Feb. 29, 2012, and assigned application Ser. No. 13/407,919, which is incorporated herein by reference in its entirety.

BACKGROUND

Many forms of input devices exist to facilitate user input for an application that has a user interface. Various types of input devices may include joysticks, keyboards, mice, pointing sticks, touch pads, touch screens, light guns, game controllers, microphones, and so on. Such devices are typically directly connected to the computing device on which the application is executed, either through a wired connection or a wireless connection.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to reducing input processing latency in remotely executed applications. Mobile devices, such as smartphones, tablet computing devices, electronic book readers, and so on, often employ touch screens as a primary input device for interacting with applications. Although a user may, in some cases, simply tap the screen to select a button or another control, other cases of touch screen input may be significantly more complex. As a non-limiting example, a user may swipe a finger across the screen to indicate a particular action or command. Such actions may be referred to as gestures. The location, velocity, and direction of the swipe may be significant in distinguishing the intended gesture from non-intended gestures. User input from accelerometers and/or other input devices may also be used to define gestures.

Gesture identification may employ significant processing resources in a mobile device and may introduce latency. This latency may diminish the user experience, particularly when interactive applications are executed remotely over a network. Although remote execution offers many advantages, additional latency results from data transmission to the remote server.

Various embodiments of the present disclosure compensate for network-caused latency with remote execution by moving the user input processing and gesture recognition from the client side to the server side. Server-side input processing may leverage more powerful computing resources in comparison to the mobile device, resulting in reduced input processing latency. In addition, the server-side input processing may employ techniques such as forward prediction and interpolation in order to overcome latency resulting from lost or delayed user input data. In the following discussion, a general description of the system and its components is provided, followed by a discussion of the operation of the same.

Figure 1:
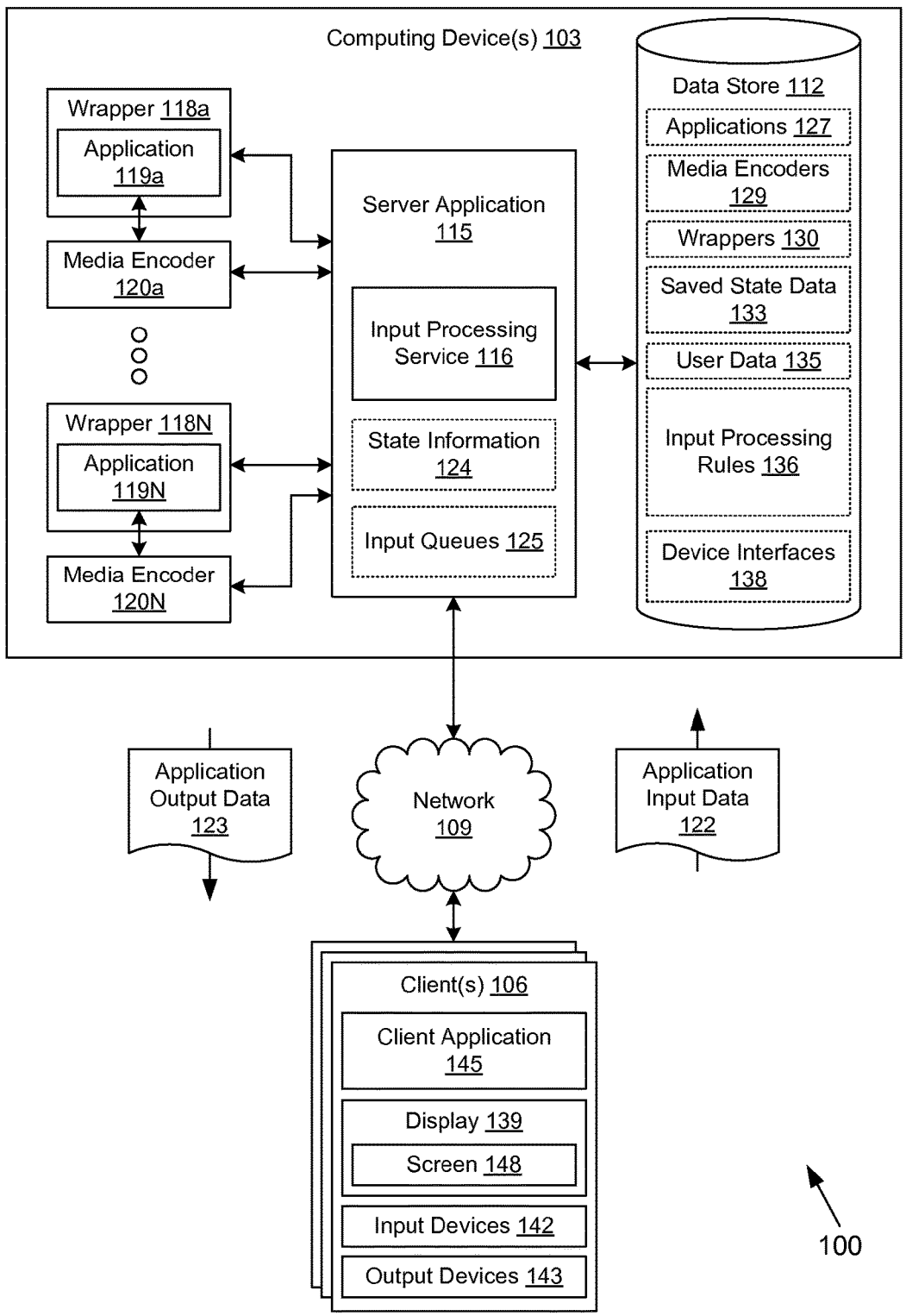
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a server application 115, an input processing service 116, a plurality of wrappers 118a . . . 118N, a plurality of applications 119a . . . 119N, a plurality of media encoders 120a . . . 120N, and other applications, services, processes, systems, engines, or functionality not discussed in detail herein. The server application 115 may correspond to a game server application or another type of application session server. The server application 115 is executed to launch applications 119, which are executed within the wrappers 118. The server application 115 is also executed to obtain application input data 122 from the clients 106 and provide the application input data 122 to the respective wrapper 118.

The server application 115 is also executed to send application output data 123 that is captured from the application 119 to the clients 106. The server application 115 may communicate with the client 106 over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 109. The server application 115 may be configured to maintain state information 124 and input queues 125 associated with the executing applications 119.

The input processing service 116 is executed in conjunction with the server application 115 to process the application input data 122 obtained from the client 106. Such processing may involve performing gesture recognition on raw gesture data captured, for example, by a touch screen of the client 106. The raw gesture data may also include user input data captured from other input devices of the client 106. The client 106 may be configured to perform this processing in the normal case in which an application is locally executed by the client 106.

In various scenarios, the processing may include applying a high pass filter, applying a low-pass filter, performing an interpolation, and/or performing other signal processing techniques. Further, the input processing service 116 may perform forward prediction to estimate missing or delayed user input data. The input processing service 116 may also correct or adjust previous predictions in response to additional user input data being obtained. Once the user input data is processed (e.g., to identify a gesture), the processed result is provided to the respective application 119, for example, by way of an application programming interface (API) or other interface.

The application 119 may correspond, for example, to a game or other types of applications. As non-limiting examples, the application 119 may correspond to a first-person shooter game, an action game, an adventure game, a party game, a role-playing game, a simulation game, a strategy game, a vehicle simulation game, and/or other types of games. The application 119 may be a game originally designed for execution in a general-purpose computing device or in a specialized video game device such as, for example, a video game console, a handheld game device, an arcade game device, etc. The applications 119 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications.

The application 119 may expect to access one or more resources of the device on which it is executed. Such resources may correspond to display devices, input devices, or other devices. In some cases, the application 119 may request exclusive access to one or more of the resources, whereby no other applications may have access to the particular resources.

The wrapper 118 corresponds to an application that provides a hosted environment for execution of the application 119. In various embodiments, the wrapper 118 may be configured to provide a virtualized environment for the application 119 by virtualizing one or more of the resources that the application 119 expects to access. Such resources may include a keyboard, a mouse, a joystick, a video device, a sound device, etc. In this way, the wrapper 118 is able to provide input commands to the application 119 as if the wrapper 118 emulates a keyboard, a mouse, an accelerometer, a touch screen, or another type of input device.

Further, the wrapper 118 is able to obtain a video signal generated by the application 119 as if the wrapper 118 emulates a display device, an audio device, or another type of output device. The wrapper 118 is able to encode the video signal and/or audio signal by way of a media encoder 120 into a media stream. To this end, the wrapper 118 may include various types of media encoders 120, such as, for example, Moving Pictures Experts Group (MPEG) encoders, H.264 encoders, Flash® media encoders 120, etc. Such media encoders 120 may be selected according to factors such as, for example, data reduction, encoding quality, latency, etc. In some embodiments, the wrappers 118 may communicate directly with the clients 106 to obtain the application input data 122 and to serve up the application output data 123.

Different types of wrappers 118 may be provided for different applications 119 or classes of applications 119. As non-limiting examples, different wrappers 118 may be provided for applications 119 using different application programming interfaces (APIs) such as OpenGL®, DirectX®, the Graphics Device Interface (GDI), and so on. Where the application 119 is configured for execution in a specialized video game device or another type of computing device, the wrapper 118 may include an emulation application that emulates the device. In some embodiments, the output of the application 119 may be captured by the wrapper 118 at a device level. For example, the application 119 may be executed in a physical game console, and the video output may be captured by way of a video graphics array (VGA) connection, a high-definition multimedia interface (HDMI) connection, a component video connection, a national television system committee (NTSC) television connection, and/or other connections.

The state information 124 that is maintained by the server application 115 includes various data relating to application sessions that are currently active. For example, the state information 124 may track the users that are currently participating in the application session, status information associated with the users, security permissions associated with the application session (e.g., who can or cannot join), and so on. In some embodiments, some or all of the state information 124 may be discarded when an application session ends. The optional input queues 125 collect input data or commands from the application input data 122 for a given application 119. The input data may be reordered to a correct sequence and delays may be inserted between commands to ensure that they are interpreted correctly when presented to the corresponding application 119. In some embodiments, the input queues 125 may be absent in order to reduce latency.

The data stored in the data store 112 includes, for example, applications 127, media encoders 129, wrappers 130, saved state data 133, user data 135, input processing rules 136, device interfaces 138, and potentially other data. The applications 127 correspond to a library of different applications that are available to be launched as applications 119. The applications 127 may correspond to executable code within the computing device 103. Alternatively, the applications 127 may correspond to code that is executable within another type of device but is not executable within the computing device 103. Such applications 127 may be referred to as "binaries," read-only memory images (ROMs), and other terms. A particular application 127 may be executed as multiple instances of the applications 119 for multiple application sessions.

The media encoders 129 correspond to the various types of media encoders 120 that may be employed in the computing device 103. Some media encoders 129 may correspond to specific formats, such as, for example, H.264, MPEG-4, MPEG-2, and/or other formats. The wrappers 130 correspond to the executable code that implements the various types of wrappers 118. The wrappers 130 are executable in the computing device 103 and may be executed as multiple instances of the wrappers 118 for multiple application sessions.

The saved state data 133 corresponds to application states that have been saved by the applications 119. Because the applications 119 may be executed in a virtualized environment, the applications 119 may write state information to a virtual location, which is then mapped for storage in the data store 112 as the saved state data 133. The saved state data 133 may correspond to data saved normally by the application 119 or may correspond to a memory image of the application 119 that may be resumed at any time. The user data 135 includes various data related to the users of the applications 119, such as, for example, security credentials, application preferences, billing information, a listing of other users that are permitted to join application sessions started by the user, and so on.

The input processing rules 136 include rules to configure processing of the application input data 122 by the input processing service 116. The input processing rules 136 may configure when high pass filtering is applied, when low pass filtering is applied, when interpolation is performed, when forward prediction is employed, when prediction correction is employed, and/or other processing functions. The input processing rules 136 may also configure gesture identification using the processed application input data 122.

The client 106 is representative of a plurality of client devices that may be coupled to the network 109. The clients 106 may be geographically diverse. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 106 may include a display 139. The display 139 may comprise, for example, one or more devices such as cathode ray tubes (CRTs), liquid crystal display (LCD) screens, gas plasma-based flat panel displays, LCD projectors, or other types of display devices, etc. The client 106 may include one or more input devices 142. The input devices 142 may comprise, for example, devices such as keyboards, mice, joysticks, accelerometers, light guns, game controllers, touch pads, touch sticks, touch screens, push buttons, optical sensors, microphones, webcams, and/or any other devices that can provide user input. Additionally, various input devices 142 may incorporate haptic technologies in order to provide feedback to the user. The output devices 143 may correspond to the output sections of haptic input devices 142, vibration devices, buzzing devices, audio devices, indicator lights, seven-segment display devices, and so on.

The client 106 may be configured to execute various applications such as a client application 145 and/or other applications. The client application 145 is executed to allow a user to launch, join, play, or otherwise interact with an application 119 executed in the computing device 103. To this end, the client application 145 is configured to capture input data provided by the user through one or more of the input devices 142 and send this input over the network 109 to the computing device 103 as application input data 122. Normal processing of the application input data 122 by the client 106 may be bypassed in favor of server-side processing in various embodiments.

The client application 145 is also configured to obtain application output data 123 over the network 109 from the computing device 103 and render a screen 148 on the display 139. To this end, the client application 145 may include one or more video and audio players to play out a media stream generated by an application 119. In one embodiment, the client application 145 comprises a plug-in within a browser application. The client 106 may be configured to execute applications beyond the client application 145 such as, for example, browser applications, email applications, instant message applications, and/or other applications. In some embodiments, multiple clients 106 may be employed for one or more users to interact with the application 119. As non-limiting examples, some clients 106 may be specialized in display output, while other clients 106 may be specialized in obtaining user input. It is noted that different clients 106 may be associated with different latency requirements which may affect a delay employed before providing input commands to the application 119.

Next, a general description of the operation of the various components of the networked environment 100 is provided. To begin, a user at a client 106 sends a request to launch an application 119 to the server application 115. The server application 115 obtains the corresponding application 127, media encoder 129, and wrapper 130 from the data store 112. The server application 115 then launches the application 119 in the corresponding wrapper 118. The server application 115 tracks the status of the application 119 within the state information 124.

The wrapper 118 provides a hosted environment for execution of the application 119. In some embodiments, the hosted environment may include a virtualized environment for the application 119 that virtualizes one or more resources of the computing device 103. Such resources may include exclusive resources, i.e., resources for which the application 119 requests exclusive access. For example, the application 119 may request full screen access from a video device, which is an exclusive resource because normally only one application can have full screen access. Furthermore, the wrapper 118 may virtualize input devices such as, for example, keyboards, mice, etc. which may not actually be present in the computing device 103. In various embodiments, the wrapper 118 may correspond to a virtual machine and/or the wrapper 118 may be executed within a virtual machine.

The user at the client 106 enters input commands for the application 119 by use of the input devices 142 of the client 106. As a non-limiting example, the user may depress a left mouse button. Accordingly, the client application 145 functions to encode the input command into a format that may be transmitted over the network 109 within the application input data 122. The server application 115 receives the input data, processes it using the input processing service 116, adds it the processed input command or gesture to the input queue 125 for the application 119, and ultimately passes the processed input command or gesture to the wrapper 118.

Meanwhile, the graphical output of the application 119 is captured by the wrapper 118 and encoded into a media stream. Additionally, the audio output of the application 119 may be captured and multiplexed into the media stream. The graphical output and/or audio output of the application 119 may be captured by hardware devices of the computing device 103 in some embodiments. The media stream is transmitted by the server application 115 to the client 106 over the network 109 as the application output data 123. The client application 145 obtains the application output data 123 and renders a screen 148 on the display 139.

Where the input devices 142 incorporate haptic technologies and devices, force feedback may be provided to the input devices 142 within the application output data 123. As a non-limiting example, a simulated automobile steering wheel may be programmed by force feedback to give the user a feel of the road. As a user makes a turn or accelerates, the steering wheel may resist the turn or slip out of control. As another non-limiting example, the temperature of the input device 142 may be configured to change according to force feedback. In one embodiment, force feedback generated from the application input data 122 of one client 106 may be included in the application output data 123 sent to another client 106. Force feedback or other output data may be mapped to different output devices 143 of the client 106. For example, a vibration device of a virtualized smartphone may be mapped to an audio sample to be played out on another type of client 106 without a vibration device.

Because the client 106 is decoupled from the hardware requirements of the application 119, the application 119 may be used remotely through a diverse variety of clients 106 that are capable of streaming video with acceptable bandwidth and latency over a network 109. For example, a game application 119 may be played on a client 106 that is a smartphone. Thus, the client 106 need not include expensive graphics hardware to perform the complex three-dimensional rendering that may be necessary to execute the application 119. By contrast, the hardware of the computing device 103 may be upgraded as needed to meet the hardware requirements of the latest and most computationally intensive applications 119. In various embodiments, the video signal in the media stream sent by the server application 115 may be scaled according to the bitrate and/or other characteristics of the connection between the computing device 103 and the client 106 over the network 109.

Figure 2:
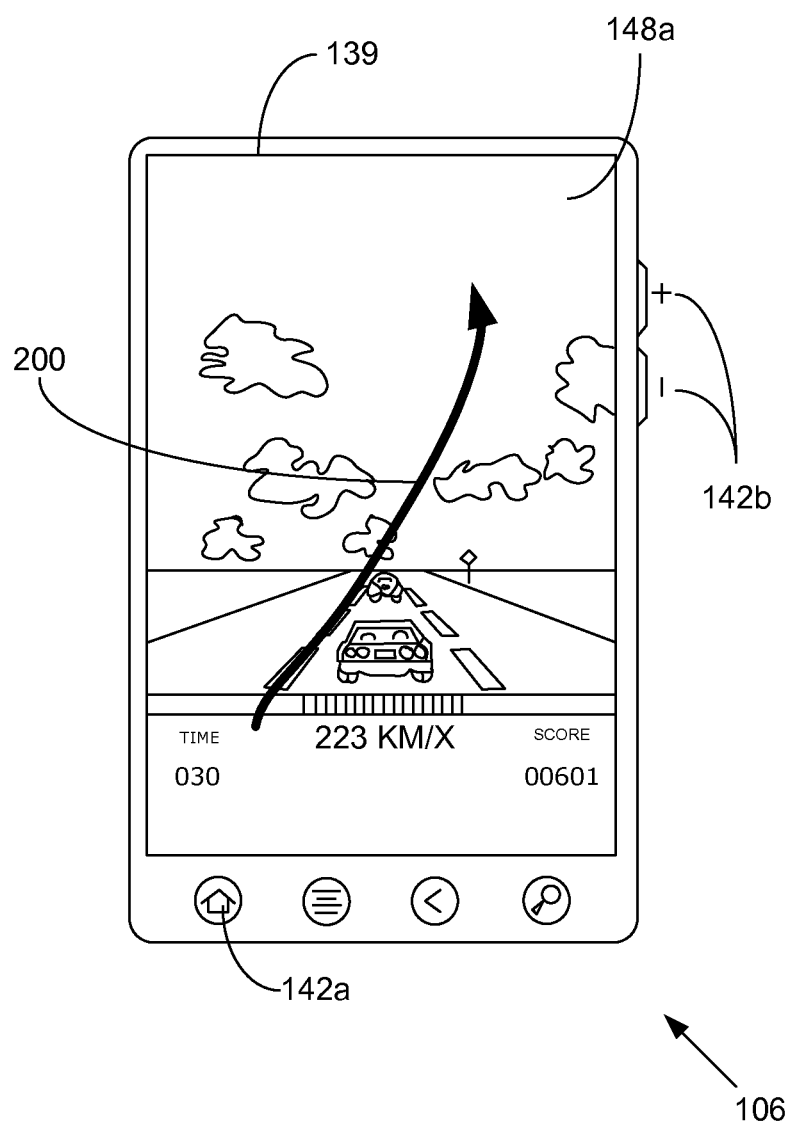
FIG. 2 is a drawing of an example of a client employed in the networked environment of FIG. 1 according to various embodiments of the present disclosure.

Turning now to FIG. 2, shown is one example of a client 106 employed in the networked environment 100 (FIG. 1). In the non-limiting example of FIG. 2, the client 106 is a smartphone. The display 139 of the client 106 is a touch screen. Rendered upon the touch screen by the client application 145 (FIG. 1) is a screen 148a corresponding to the visual output of an application 119 (FIG. 1). Also shown in FIG. 2 as being a part of the client 106 are input devices 142a and 142b that are buttons. The input devices 142b correspond to volume controls for the client 106. An audio device of the client 106 may be configured to play out an audio signal generated by the application 119.

The application 119 corresponds to a racing game application 119 that is native to a smartphone platform. Rather than being executed in the client 106, the application 119 is executed in the hosted environment of a wrapper 118 (FIG. 1) that emulates a smartphone device. The wrapper 118 is further configured to virtualize various input and/or output devices of smartphone device for the application 119. In this particular racing game application 119, the user is able to steer a vehicle shown on the screen 148a by making a finger stroke on the touch screen to define a gesture 200. The starting location, trajectory, velocity, and/or other factors associated with the gesture 200 may be interpreted by the application 119 to perform the steering action. Instead of performing processing on the raw gesture input data from the touch screen by the client 106, the client application 145 merely packages up the raw gesture input data and sends it to the computing device 103 (FIG. 1) for further processing.

Figure 3A:
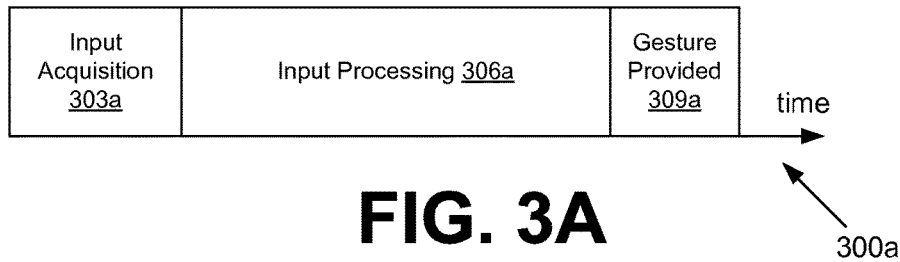
FIGS. 3A-3C illustrate examples of timelines for input processing employed in the networked environment of FIG. 1 according to various embodiments of the present disclosure.
Figure 3B:
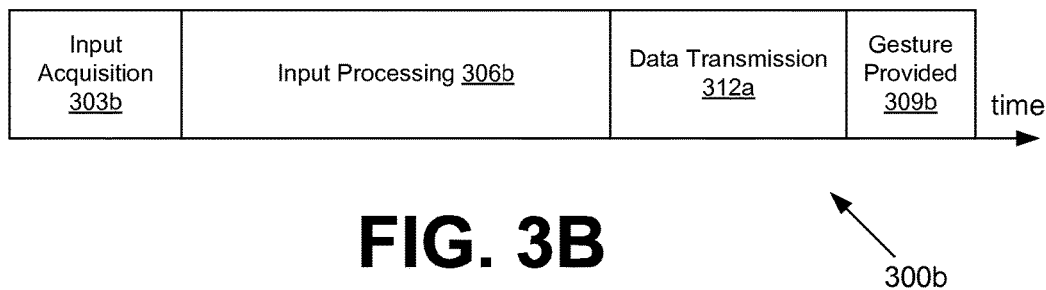
Figure 3C:
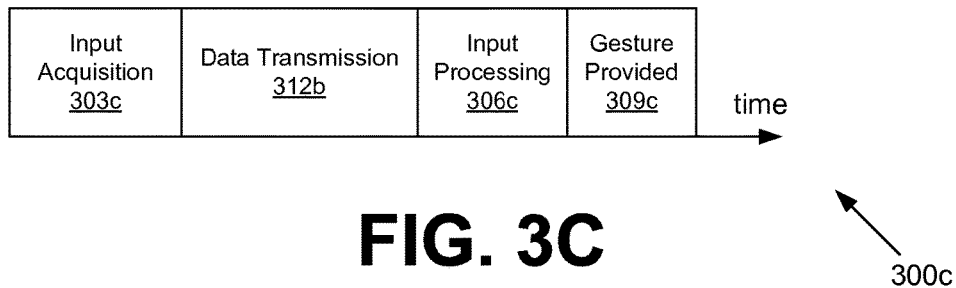

Referring next to FIGS. 3A-3C, shown are three examples of timelines 300a, 300b, and 300c that illustrate various phases of input processing. FIG. 3A represents input processing for applications 119 (FIG. 1) which are locally executed by the client 106 (FIG. 1). In timeline 300a, input processing is divided into three exemplary phases: input acquisition 303a, input processing 306a, and gesture provided 309a. In input acquisition 303a, the raw user input is acquired from the various input devices 142 (FIG. 1) of the client 106. In input processing 306a, the raw user input is "cleaned up" and signal processing may be performed as part of recognizing and identifying a gesture. The phase of input processing 306a may take a relatively long time due to the available processing resources of the client 106, which may be limited. Under gesture provided 309a, the processed user input data corresponding to a gesture is provided to a locally executed application 119 on the client 106.

FIG. 3B represents input processing for applications 119 which are remotely executed in the computing device 103 (FIG. 1). In timeline 300b, input processing is divided into four exemplary phases: input acquisition 303b, input processing 306b, data transmission 312a, and gesture provided 309b. In input acquisition 303b, the raw user input is acquired from the various input devices 142 of the client 106. In input processing 306b, the raw user input is "cleaned up" and signal processing may be performed as part of recognizing and identifying a gesture. During data transmission 312a, the processed user input data is sent to the computing device 103 by way of the network 109, which adds latency relative to timeline 300a. Under gesture provided 309b, the processed user input data corresponding to a gesture is provided to remotely executed application 119 of the computing device 103.

FIG. 3C also represents input processing for applications 119 which are remotely executed in the computing device 103. In timeline 300c, input processing is divided into four exemplary phases: input acquisition 303c, input processing 306c, data transmission 312b, and gesture provided 309c. In input acquisition 303b, the raw user input is acquired from the various input devices 142 of the client 106. During data transmission 312b, the raw user input data is sent to the computing device 103 by way of the network 109, which adds latency as in timeline 300b. Unlike timeline 300b, the input processing 306c occurs in the computing device 103. The computing device 103 may have unbounded computing resources to devote to the input processing 306c, thereby resulting in a shorter duration for the input processing 306c relative to the input processing 306b. Under gesture provided 309c, the processed user input data corresponding to a gesture is provided to remotely executed application 119 of the computing device 103.

It is noted that the total duration of the timeline 300c may be less than that of the timeline 300b, and may be equal to, or even less than, the duration of the timeline 300a. That is to say, by shifting the input processing 306c to the server-side, the total input processing latency may be reduced, perhaps even as much as to compensate for the latency introduced by the data transmission 312b. Additionally, the gesture provided 309c phase may begin before data transmission 312b is completed due to forward prediction or estimation in some embodiments.

Figure 4:
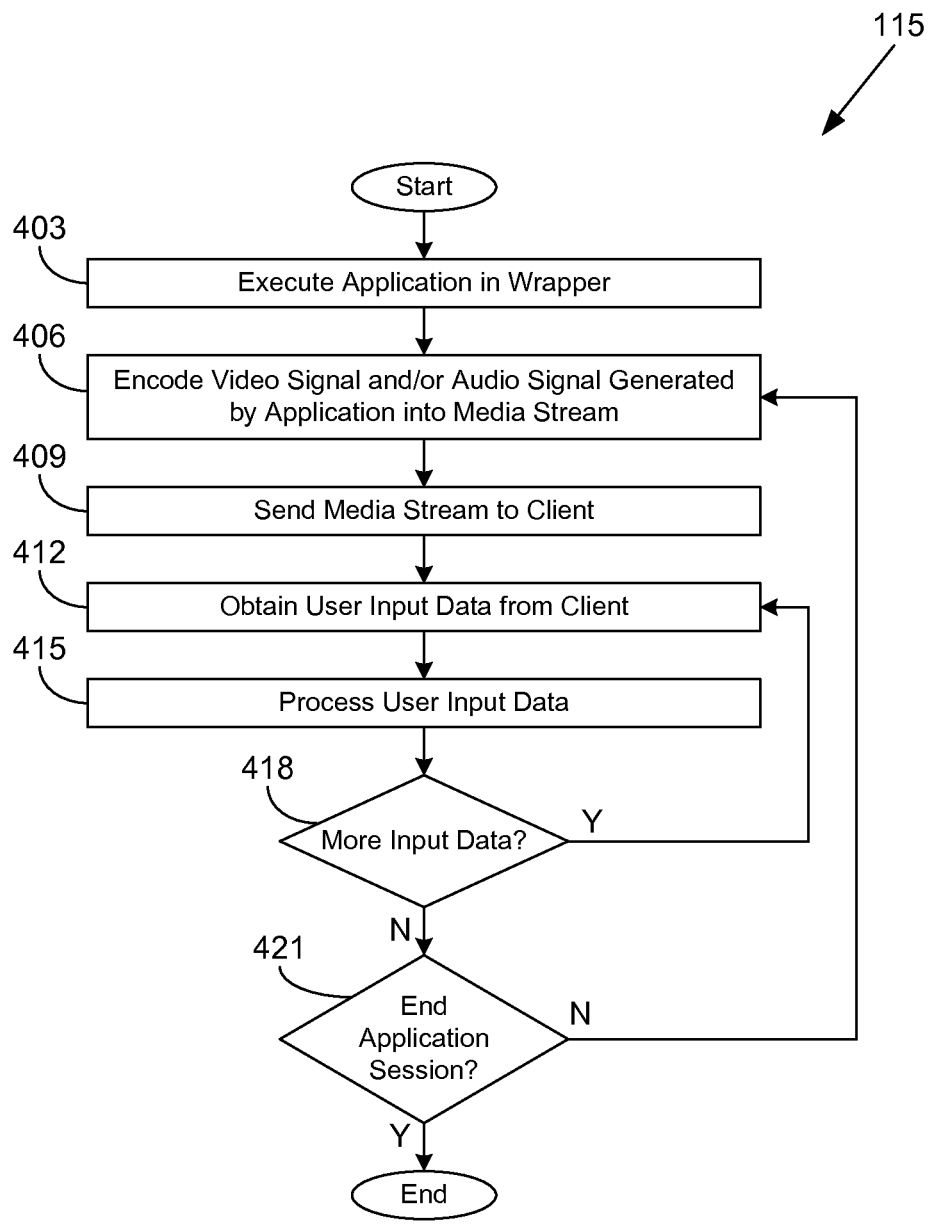
FIG. 4 is a flowchart illustrating one example of functionality implemented as portions of a server application executed in a computing device in the networked environment of FIG. 1 according to various embodiments of the present disclosure.

Referring next to FIG. 4, shown is a flowchart that provides one example of the operation of a portion of the server application 115 according to various embodiments. It is understood that the flowchart of FIG. 4 provides merely an example of the many different types of functional arrangements that may be employed to implement the operation of the portion of the server application 115 as described herein. As an alternative, the flowchart of FIG. 4 may be viewed as depicting an example of steps of a method implemented in the computing device 103 (FIG. 1) according to one or more embodiments.

Beginning with box 403, the server application 115 executes an application 119 (FIG. 1) in a wrapper 118 (FIG. 1). In box 406, the server application 115 encodes a video signal and/or audio signal generated by the application 119 into a media stream by way of a media encoder 120 (FIG. 1). In box 409, the server application 115 sends the media stream to a client 106 (FIG. 1) over the network 109 (FIG. 1) in the application output data 123 (FIG. 1).

In box 412, the server application 115 obtains unprocessed user input data from the client 106 over the network 109 in the application input data 122 (FIG. 1). In box 415, the server application 115 uses the input processing service 116 (FIG. 1) to process the user input data. The input processing service 116 may be configured to process the unprocessed user input data at a first processing rate that is above a second processing rate associated with a normal processing of the unprocessed user input data in the client 106. The first processing rate may be selected so as to compensate for a latency introduced by the network 109 (FIG. 1).

In box 418, the server application 115 determines whether additional input data is provided. If additional input data is provided, the server application 115 returns to box 412 and obtains the additional input data from the client 106. If no other input data is provided, the server application 115 transitions instead from box 418 to box 421. In box 421, the server application 115 determines whether the application 119 session is to be ended. If the session is not to be ended, the server application 115 returns to box 406 and continues encoding the media stream. Otherwise, if the session is to be ended, the portion of the server application 115 ends.

Figure 5:
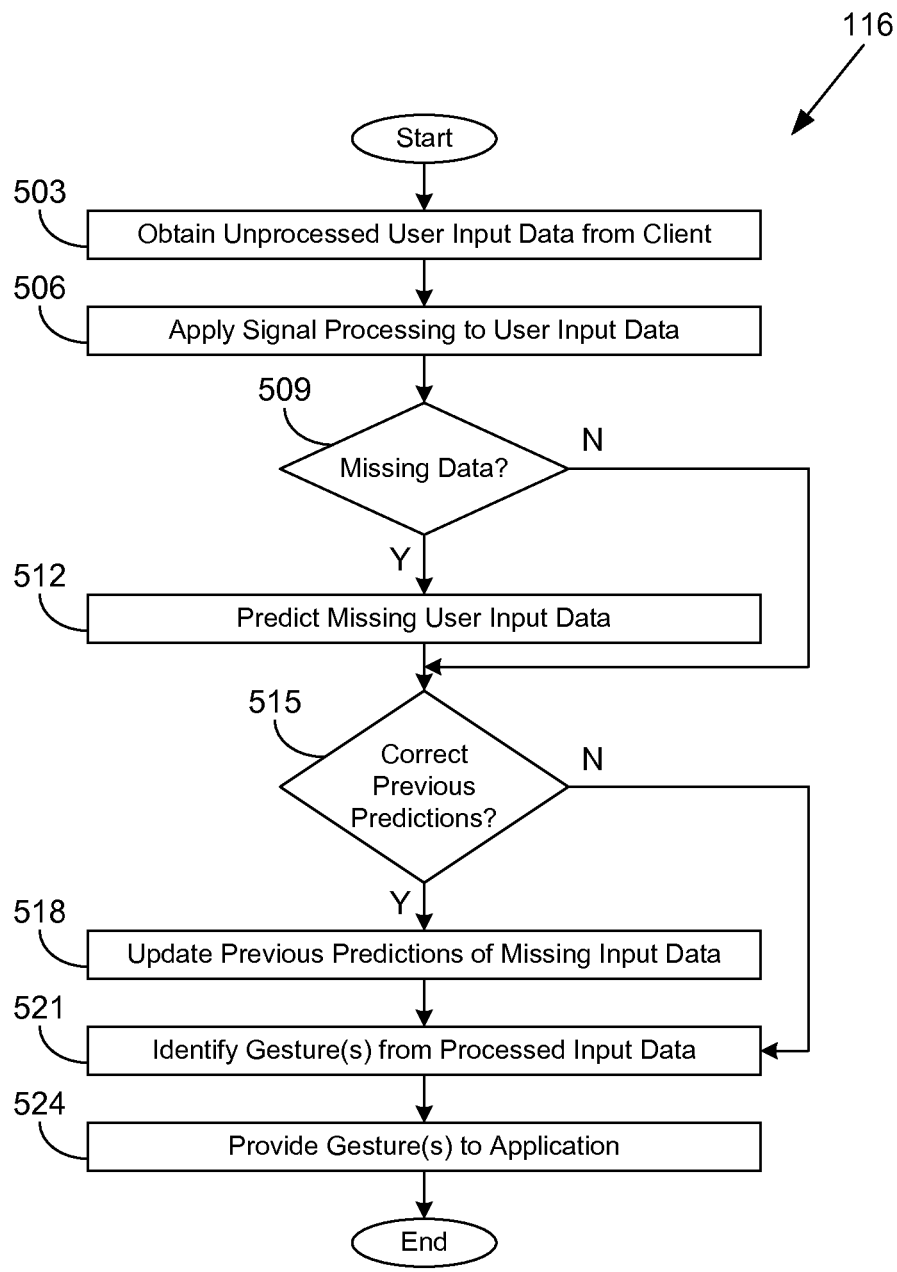
FIG. 5 is a flowchart illustrating one example of functionality implemented as portions of an input processing service executed in a computing device in the networked environment of FIG. 1 according to various embodiments of the present disclosure.

Continuing on to FIG. 5, shown is a flowchart that provides one example of the operation of a portion of the input processing service 116 according to various embodiments. It is understood that the flowchart of FIG. 5 provides merely an example of the many different types of functional arrangements that may be employed to implement the operation of the portion of the input processing service 116 as described herein. As an alternative, the flowchart of FIG. 5 may be viewed as depicting an example of steps of a method implemented in the computing device 103 (FIG. 1) according to one or more embodiments.

Beginning with box 503, the input processing service 116 obtains unprocessed user input data from the client 106 (FIG. 1) by way of the network 109 (FIG. 1). In box 506, the input processing service 116 applies signal processing techniques to the user input data. For example, the signal processing techniques may include applying a high pass filter, applying a low pass filter, performing an interpolation, and so on. In box 509, the input processing service 116 determines whether input data for identifying a gesture is missing from the stream of user input data. Such data may be lost or delayed by the network 109. If data is missing, the input processing service 116 predicts the missing user input data in the stream of user input data in box 512 using dead reckoning and/or other approaches. The input processing service 116 then continues to box 515. If no data is missing, the input processing service 116 moves from box 509 to box 515.

In box 515, the input processing service 116 determines whether previous predictions are to be adjusted or corrected in some way according to currently received input data. If a previous prediction is to be corrected, the input processing service 116 moves to box 518 and updates one or more previous predictions regarding missing input data. The input processing service 116 proceeds to box 521. If a previous prediction is not to be corrected, the input processing service 116 proceeds directly from box 515 to box 521.

In box 521, the input processing service 116 identifies one or more gestures from the processed user input data. In box 524, the input processing service 116 provides the gesture(s) to the application 119 (FIG. 1) by way of an application programming interface (API), a virtualized input device, or another approach. Thereafter, the portion of the input processing service 116 ends.

Figure 6:
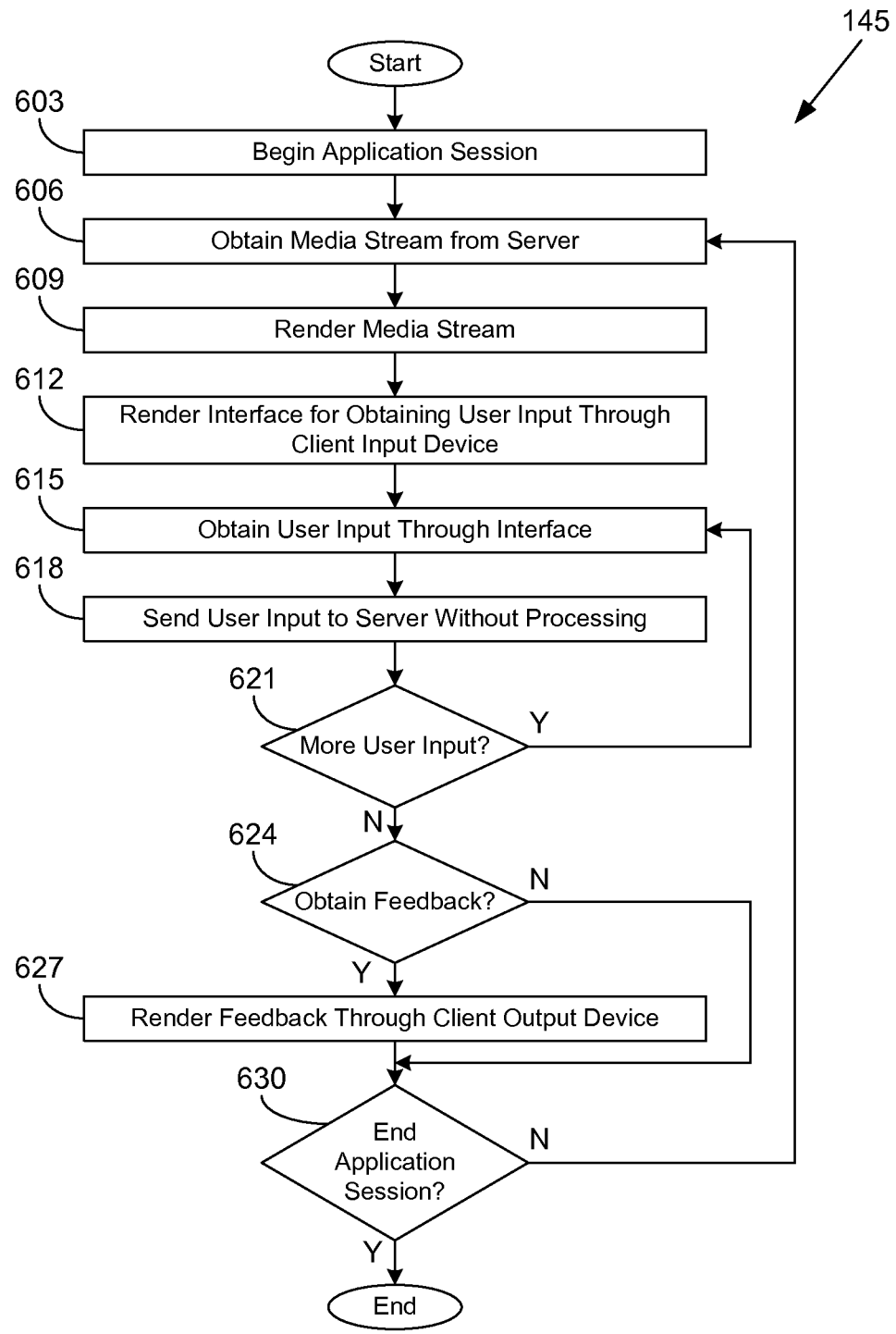
FIG. 6 is a flowchart illustrating one example of functionality implemented as portions of a client application executed in a client in the networked environment of FIG. 1 according to various embodiments of the present disclosure.

Turning now to FIG. 6, shown is a flowchart that provides one example of the operation of a portion of the client application 145 according to various embodiments. It is understood that the flowchart of FIG. 6 provides merely an example of the many different types of functional arrangements that may be employed to implement the operation of the portion of the client application 145 as described herein. As an alternative, the flowchart of FIG. 6 may be viewed as depicting an example of steps of a method implemented in the client 106 (FIG. 1) according to one or more embodiments.

Beginning with box 603, the client application 145 begins a session of an application 119 (FIG. 1) executed by a wrapper 118 (FIG. 1) in the computing device 103 (FIG. 1). In box 606, the client application 145 obtains the media stream over the network 109 (FIG. 1) from the server application 115 (FIG. 1) in the application output data 123 (FIG. 1). In box 609, the client application 145 renders the media stream. For example, the client application 145 may render a video signal of the media stream on a display 139 (FIG. 1) as a screen 148 (FIG. 1). Also, the client application 145 may render an audio signal of the media stream through an audio output device 143 (FIG. 1) of the client 106. In box 612, the client application 145 may render an interface 203 (FIG. 2B) for obtaining user input for the application 119 through an input device 142 (FIG. 1) of the client 106.

In box 615, the client application 145 obtains user input either directly or through the interface 203. In box 618, the client application 145 sends the raw user input to the server application 115 over the network 109 in the application input data 122 (FIG. 1) without performing normal processing on the data. In box 621, the client application 145 determines whether more user input is to be obtained. If more user input is to be obtained, the client application 145 returns to box 615 and obtains additional user input. If more user input is not to be obtained, the client application 145 instead proceeds to box 624.

In box 624, the client application 145 determines whether feedback or other output data is obtained from the server application 115. If feedback or other output data is obtained, then in box 627, the client application 145 renders the feedback or other output data through one or more client output devices 143. The client application 145 continues to box 630. If feedback or other output data is not obtained, the client application 145 instead transitions from box 624 to box 630. In box 630, the client application 145 determines whether the session of the application 119 has ended. If the session has not ended, the client application 145 returns to box 606 and continues obtaining the media stream from the server application 115. Otherwise, the portion of the client application 145 ends.

Figure 7:
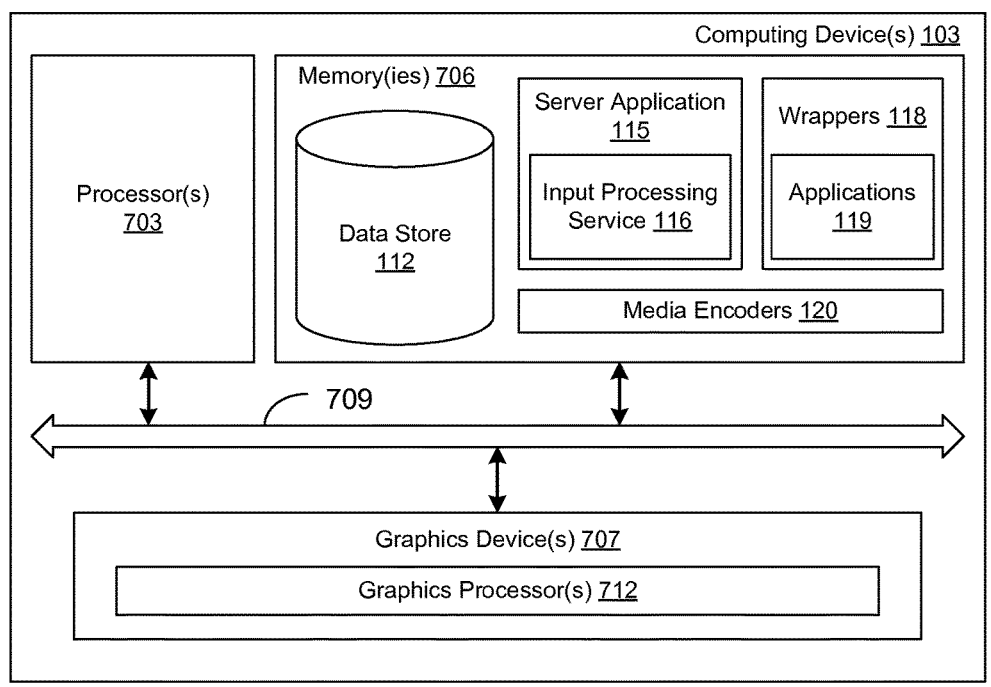
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 703, a memory 706, and one or more graphics devices 707, all of which are coupled to a local interface 709. To this end, the computing device 103 may comprise, for example, at least one server computer or like device. The local interface 709 may comprise, for example, a data bus with an accompanying address/control bus or other bus structure as can be appreciated. The graphics devices 707 may correspond to high-performance graphics hardware, including one or more graphics processors 712. The graphics devices 707 are configured to render graphics corresponding to the applications 119 executed in the computing device 103.

Stored in the memory 706 are both data and several components that are executable by the processor 703. In particular, stored in the memory 706 and executable by the processor 703 are the server application 115, the input processing service 116, the wrappers 118, the applications 119, the media encoders 120, and potentially other applications. Also stored in the memory 706 may be a data store 112 and other data. In addition, an operating system may be stored in the memory 706 and executable by the processor 703.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network 109 (FIG. 1) that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the server application 115, the input processing service 116, the wrappers 118, the applications 119, the media encoders 120, the client application 145 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4-6 show the functionality and operation of an implementation of portions of the client application 145, the input processing service 116, and the server application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the server application 115, the input processing service 116, the wrappers 118, the applications 119, the media encoders 120, and the client application 145, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a first at least one computing device, wherein when executed the program causes the first at least one computing device to at least:
    execute an application in a hosted environment;
    encode a video signal generated by the application into a media stream;
    send the media stream to a second at least one computing device by way of a network;
    receive user input data for the application relative to the video signal from the second at least one computing device by way of the network, the user input data being generated at least in part through a user interaction with an input device of the second at least one computing device;
    process the user input data in the first at least one computing device at a latency-compensating processing rate that is selected so as to compensate for a latency introduced by the network; and
    provide the processed user input data to the application.

2. The non-transitory computer-readable medium of claim 1, wherein the latency-compensating processing rate is above a normal processing rate for the user input data associated with processing of the user input data by the second at least one computing device.

3. The non-transitory computer-readable medium of claim 1, wherein the processing of the user input data further comprises determining at least one gesture represented in the user input data.

4. The non-transitory computer-readable medium of claim 1, wherein the processing of the user input data further comprises estimating a missing user input data item based at least in part on a previously received user input data item using dead reckoning.

5. A system, comprising:
    a client computing device; and
    a program executable in the client computing device, wherein when executed the program causes the client computing device to at least:
        receive a media stream from a server, the media stream including a video signal generated by an application executed in a hosted environment;
        cause the video signal to be rendered upon a display;
        receive user input relative to the video signal; and
        send data encoding the user input to the server, wherein the server is configured to process the data encoding the user input at a latency-compensating processing rate.

6. The system of claim 5, wherein the display comprises a touchscreen, and the user input relative to the video signal is received via the touchscreen.

7. The system of claim 5, wherein the server is configured to identify at least one gesture by processing the data encoding the user input.

8. The system of claim 5, wherein the latency-compensating processing rate is above a normal processing rate for the data encoding the user input, the normal processing rate being associated with the client computing device.

9. The system of claim 5, wherein when executed the program further causes the client computing device to be configured to at least bypass a normal processing in the client computing device of the user input.

10. The system of claim 5, wherein the latency-compensating processing rate is selected so as to compensate for a network latency between the client computing device and the server.

11. The system of claim 5, wherein gesture identification is not performed by the client computing device on the user input.

12. The system of claim 5, wherein when executed the program further causes the client computing device to be configured not to perform interpolation, high pass filtering, or low pass filtering on the data encoding the user input.

13. The system of claim 5, wherein when executed the program further causes the client computing device to be configured to at least receive an updated video signal in the media stream that has been generated by the application in response to the application receiving the user input that has been processed at the latency-compensating processing rate.

14. A method, comprising:
   receiving, by at least one computing device, a media stream from a server, the media stream including a video signal generated by an application executed in a hosted environment;
   causing, by the at least one computing device, the video signal to be rendered upon a display;
   receiving, by the at least one computing device, user input relative to the video signal; and
   sending, by the at least one computing device, data encoding the user input to the server, wherein the server is configured to process the data encoding the user input at a latency-compensating processing rate.

15. The method of claim 14, further comprising bypassing a client-side processing of the user input by the at least one computing device.

16. The method of claim 14, wherein the latency-compensating processing rate is above a normal processing rate for the data encoding the user input, the normal processing rate being associated with the at least one computing device.

17. The method of claim 14, further comprising receiving, by the at least one computing device, an updated video signal in the media stream that has been generated by the application in response to the application receiving the user input that has been processed at the latency-compensating processing rate.

18. The method of claim 14, wherein the at least one computing device comprises a client computing device.

19. The method of claim 14, wherein receiving the user input relative to the video signal further comprises receiving, by the at least one computing device, the user input via an accelerometer.

20. The method of claim 14, wherein the display comprises a touchscreen, and receiving the user input relative to the video signal further comprises receiving, by the at least one computing device, the user input via the touchscreen.

* * * * *